(12) United States Patent
Holmberg

(10) Patent No.: US 7,495,598 B2
(45) Date of Patent: Feb. 24, 2009

(54) METHODS AND SYSTEMS FOR AVOIDANCE OF PARTIAL PULSE INTERFERENCE IN RADAR

(75) Inventor: Bart A. Holmberg, Bellevue, WA (US)

(73) Assignee: Honeywell International Inc., Morristown, NJ (US)

(*) Notice: Subject to any disclaimer, the term of this patent is extended or adjusted under 35 U.S.C. 154(b) by 212 days.

(21) Appl. No.: 11/278,578

(22) Filed: Apr. 4, 2006

(65) Prior Publication Data

US 2007/0229347 A1 Oct. 4, 2007

(51) Int. Cl.
G01S 13/95 (2006.01)
G01S 13/28 (2006.01)
G01S 7/28 (2006.01)

(52) U.S. Cl. ............ 342/26 B; 342/129; 342/132; 342/159; 342/175; 342/201

(58) Field of Classification Search ............ 342/195, 342/160–164, 179, 111, 115, 26 R, 26 A, 342/26 B, 26 C, 26 D, 112, 129–132, 159, 342/175, 200–201

See application file for complete search history.

(56) References Cited

U.S. PATENT DOCUMENTS 3,225,349 A * 12/1965 Thor .......................... 342/163
3,905,033 A * 9/1975 Moore et al. ................ 342/163
5,745,069 A * 4/1998 Gail .......................... 342/25 F

FOREIGN PATENT DOCUMENTS

| EP | 0051361 | 5/1982 |
|----|---------|--------|
| EP | 0064305 | 11/1982 |
| EP | 0184424 | 6/1986 |
| GB | 1424026 | 6/1986 |

* cited by examiner

Primary Examiner—Thomas H Tarcza
Assistant Examiner—Cassi Galt
(74) Attorney, Agent, or Firm—Black Lowe & Graham, PLLC

(57) ABSTRACT

Systems and methods for avoidance of partial pulse interference in radar. The systems and methods include a radar processor for generating control signals that direct the generation and transmission of two consecutive radar pulses using a waveform and pulse train generator and transmitter. The systems and methods also include receiving reflected echoes corresponding to the transmitted pulses using a receiver and processing the echoes using an analog to digital converter, filter, and digital signal processor to separate echoes from each pulse, process them, and combine the results to avoid partial pulse interference while maintaining pulse energy and an acceptable signal to noise ratio.

19 Claims, 8 Drawing Sheets

METHODS AND SYSTEMS FOR AVOIDANCE OF PARTIAL PULSE INTERFERENCE IN RADAR

BACKGROUND OF THE INVENTION

Pulse compression for airborne weather radar has several advantages. Among these is the ability to provide excellent radar detection performance using a low power transmitter, which allows much lower system cost. Although pulse compression is powerful, it has an inherent drawback because it requires longer pulses to achieve the equivalent peak power signal to noise ratio (SNR) of a system not using pulse compression. This can lead to severe partial pulse interference at close ranges. Partial pulse interference is caused by radar returns from ranges closer than a pulse length from the radar. The radar receiver is turned on after the pulse transmission, so close in returns do not contain complete pulse histories. When partial pulses are processed by the pulse compression portion of the receiver, it results in range side-lobes that can overwhelm data from valid ranges which are greater than the pulse length. The amount of interference is highly dependent on the environment of a particular application. For airborne weather radar, partial pulse interference can cause false detections.

There is therefore a need for a technique to avoid partial pulse interference while maintaining pulse energy and an acceptable signal to noise ratio.

SUMMARY OF THE INVENTION

The present invention includes systems and methods for avoidance of partial pulse interference in radar. The systems and methods include a radar processor for generating control signals that direct the generation and transmission of two consecutive radar pulses using a waveform and pulse train generator and transmitter. The systems and methods also include receiving reflected echoes corresponding to the transmitted pulses using a receiver and processing the echoes using an analog to digital converter, filter, and digital signal processor to separate echoes from each pulse, process them, and combine the results to avoid partial pulse interference while maintaining pulse energy and an acceptable signal to noise ratio.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
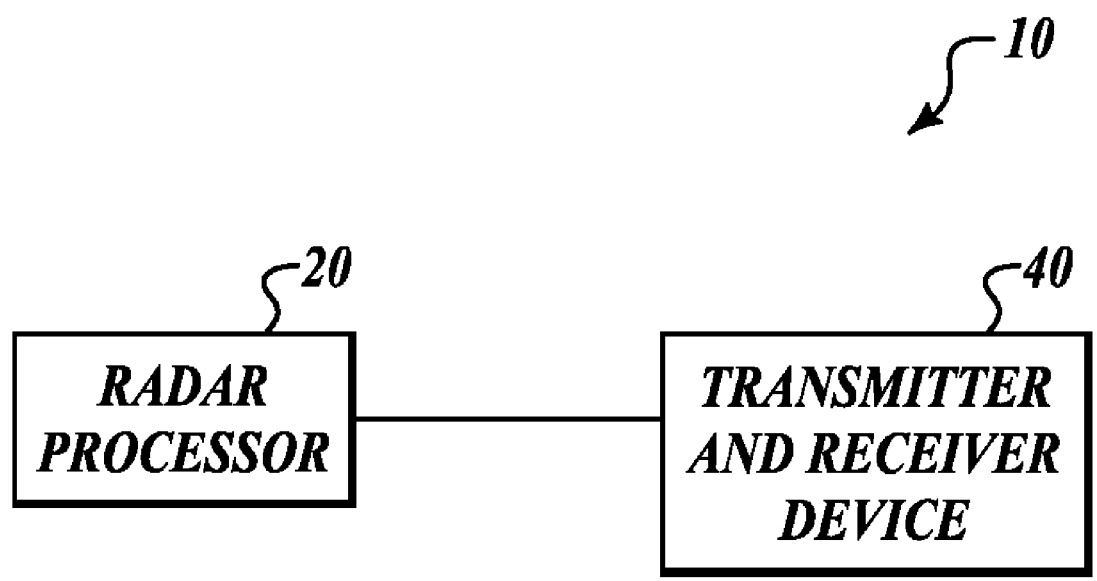
FIG. 1 is a schematic diagram of one embodiment of the present invention.

FIG. 1 is a schematic illustration of a system 10 for avoiding partial pulse interference for pulse compressed radar in accordance with an embodiment of the present invention. The system 10 includes a radar processor 20 to generate two consecutive pulses which are transmitted by a transmitter and receiver device 40. The generated pulses are each approximately of duration T/2, where T represents a pulse duration ordinarily used for pulse compressed radar at a given range. Echoes corresponding to the transmitted pulses are also received by the transmitter and receiver device 40 which are then processed into useable image data by the radar processor 20. The system 10 can be used to improve the performance of airborne weather radar systems such as Honeywell's RDR-4000 and RDR-4000M products for example.

Figure 2:
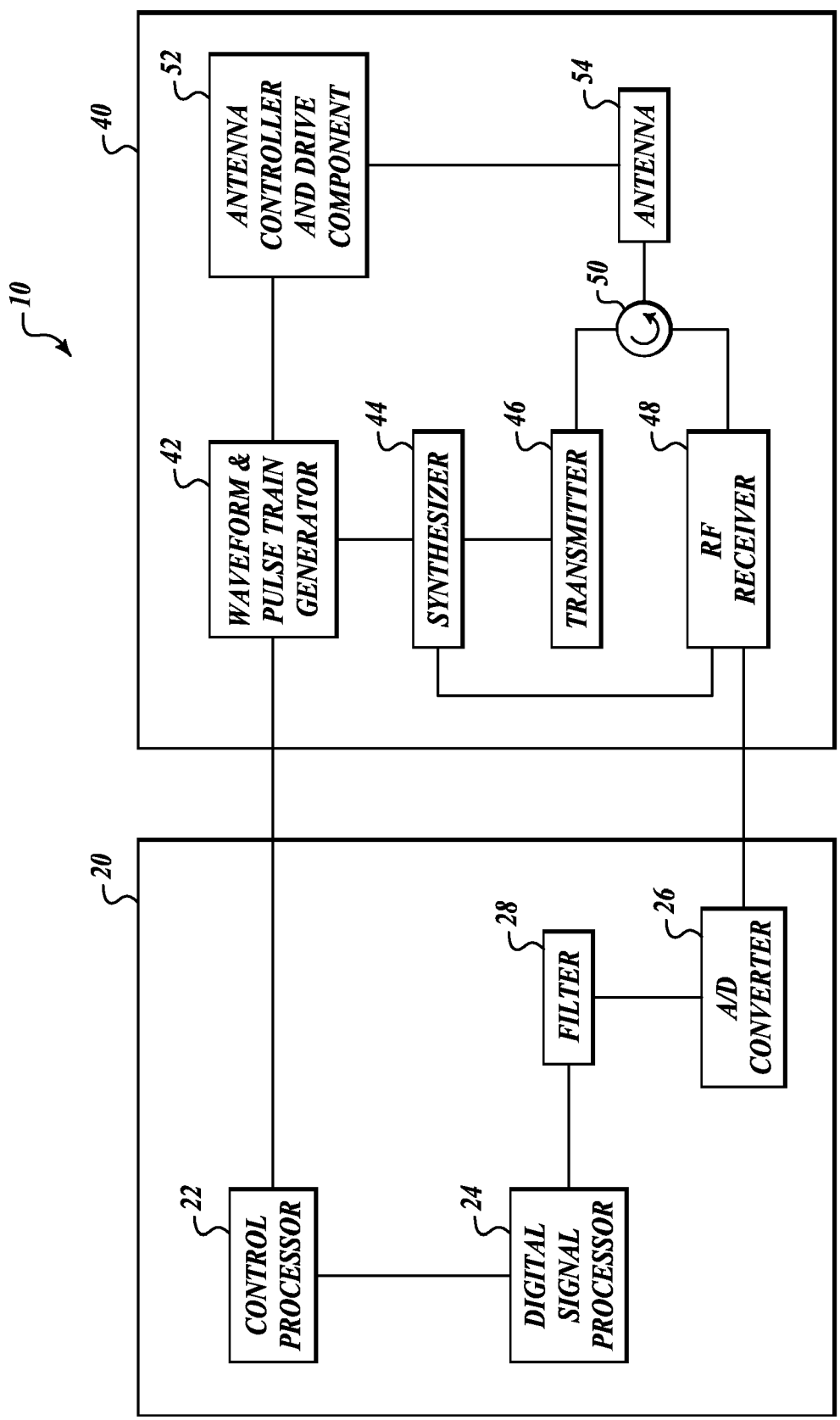
FIG. 2 is a schematic diagram showing additional detail of the system of FIG. 1.

FIG. 2 is a schematic diagram showing additional detail for the system 10 of FIG. 1. The radar processor 20 includes a control processor 22 in data communication with a Digital Signal Processor (DSP) 24 in data communication with a filter 28 linked to an analog to digital (A/D) converter 26. The transmitter and receiver device 40 includes a waveform and pulse train generator 42 in data communication with a synthesizer 44 linked to a transmitter 46 which is connected to an antenna 54 via a device 50 that controls whether a receiver 48 or the transmitter 46 is currently connected to the antenna 54. The synthesizer 44 is also linked to the receiver 48. The receiver 48 uses phase and timing information from the synthesizer 44 to coherently modulate received radar data. The transmitter and receiver device 40 also includes an antenna controller and drive component 52 which is connected to the waveform and pulse train generator 42 as well as the antenna 54. FIG. 2 also illustrates more detailed links between the radar processor 20 and the transmitter and receiver device 40. The control processor 22 is in data communication with the waveform and pulse train generator 42, and directs the transmitter and receiver device 40 via this linkage. The receiver 48 sends the received echoes to the A/D converter 26. For example, the received echoes could enter the receiver 48 at 9.3 GHz analog and the receiver 48 would shift them in frequency to 48 MHz analog before sending them to the A/D converter 26.

Figure 3:
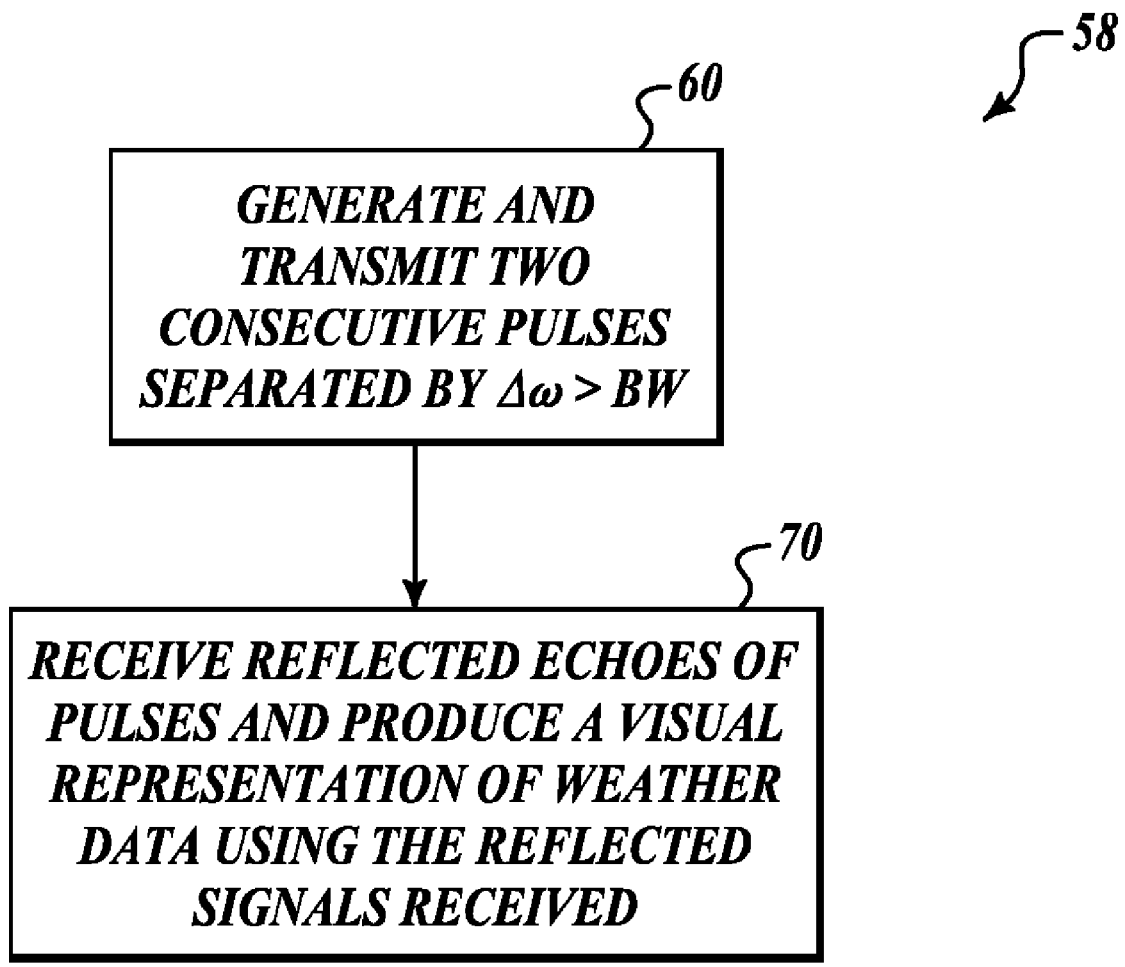
FIGS. 3-5 are flowcharts of a method of avoiding partial pulse interference in accordance with an embodiment of the present invention.

FIG. 3 is a flowchart of a method 58 to avoid partial pulse interference in airborne weather radar. The method 58 begins at a block 60, where two consecutive pulses separated in frequency by Δω>bandwidth (BW) are generated and transmitted, where BW refers to the bandwidth of a single pulse. The pulses are each approximately of duration T/2, where T represents a pulse duration ordinarily used for pulse compressed radar at a given range. Next, at a block 70, reflected echoes of the transmitted pulses are received by the transmitter and receive device 40 and a visual representation of weather data is produced by the radar processor 20 using the reflected signals received. Although not shown, these steps will be repeated in a continuous manner.

Figure 4:
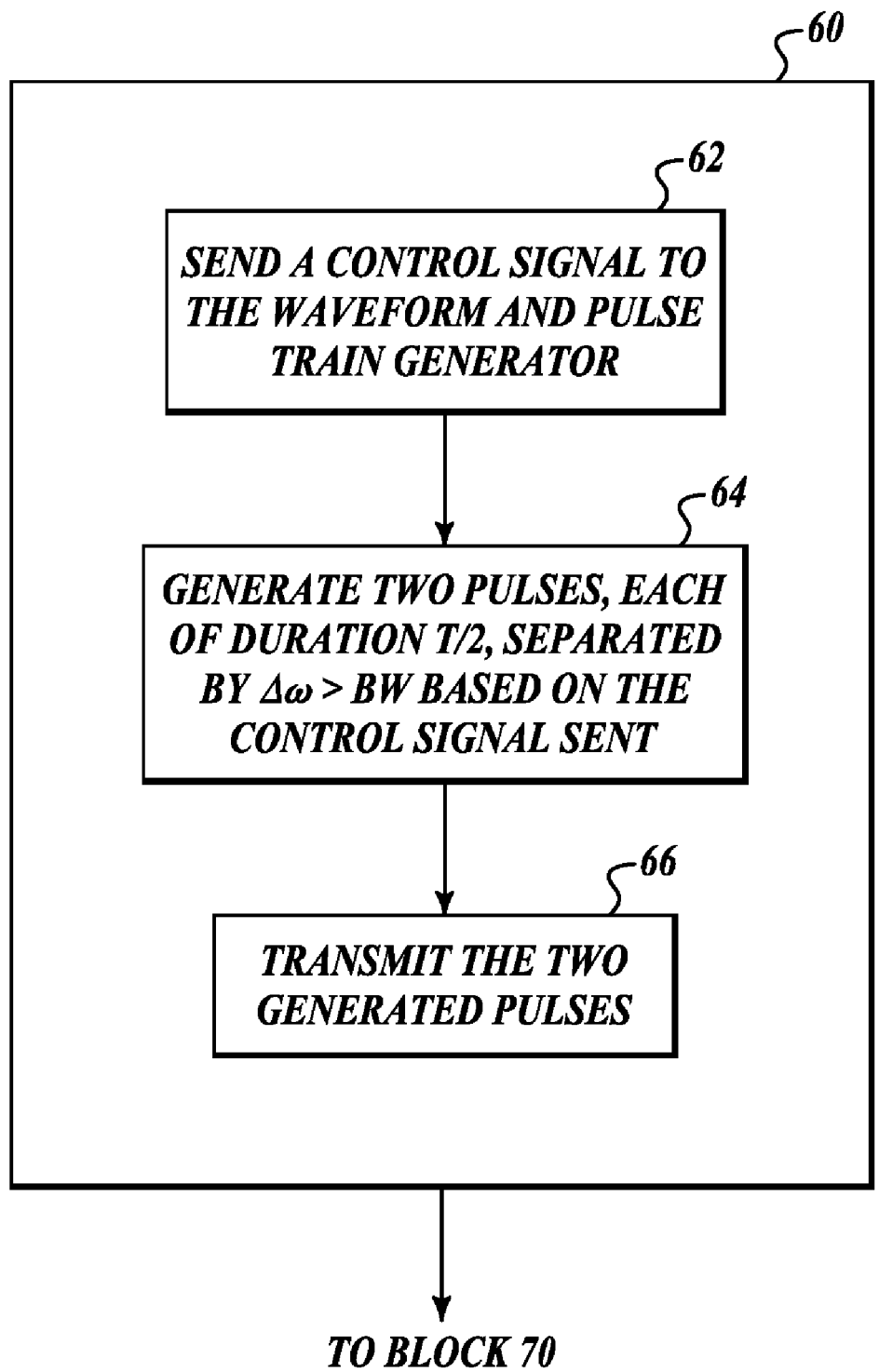

FIG. 4 is a flowchart showing additional detail for the block 60 shown in FIG. 3. The block 60 includes a block 62 where a control signal is sent to the waveform and pulse train generator 42. The control processor 22 sends a control signal to the waveform and pulse train generator 42, which is linked to the synthesizer 44. Next, at a block 64, two pulses, each of duration T/2, separated by Δω>BW are generated based on the control signal sent. The waveform and pulse train generator 42 generates a waveform based on the control signal sent and is responsible for the detailed modulation and timing of the pulses. Each pulse consists of a specific set of frequencies over the pulse width. The waveform and pulse train generator 42 creates pulses at a low center frequency, for example at 112 MHz. The waveform and pulse train generator 42 is also responsible for creating the sequence of precisely timed pulses that compose a pulse train. Each pulse in the pulse train may have a different center frequency, starting phase, modulation, and pulse width. Timing and phase jitter are also implemented using the waveform and pulse train generator 42. The synthesizer 44 then shifts the low frequency pulses up to the corresponding center frequency in the radar band, for example at 9.3 GHz, in preparation for amplification and transmission. Then, at a block 66, the two generated pulses are amplified and transmitted by the transmitter 46. The generated pulses are transmitted using the transmitter 46 which is connected to the antenna 54 via the device 50 during transmission of the pulses.

Figure 5:
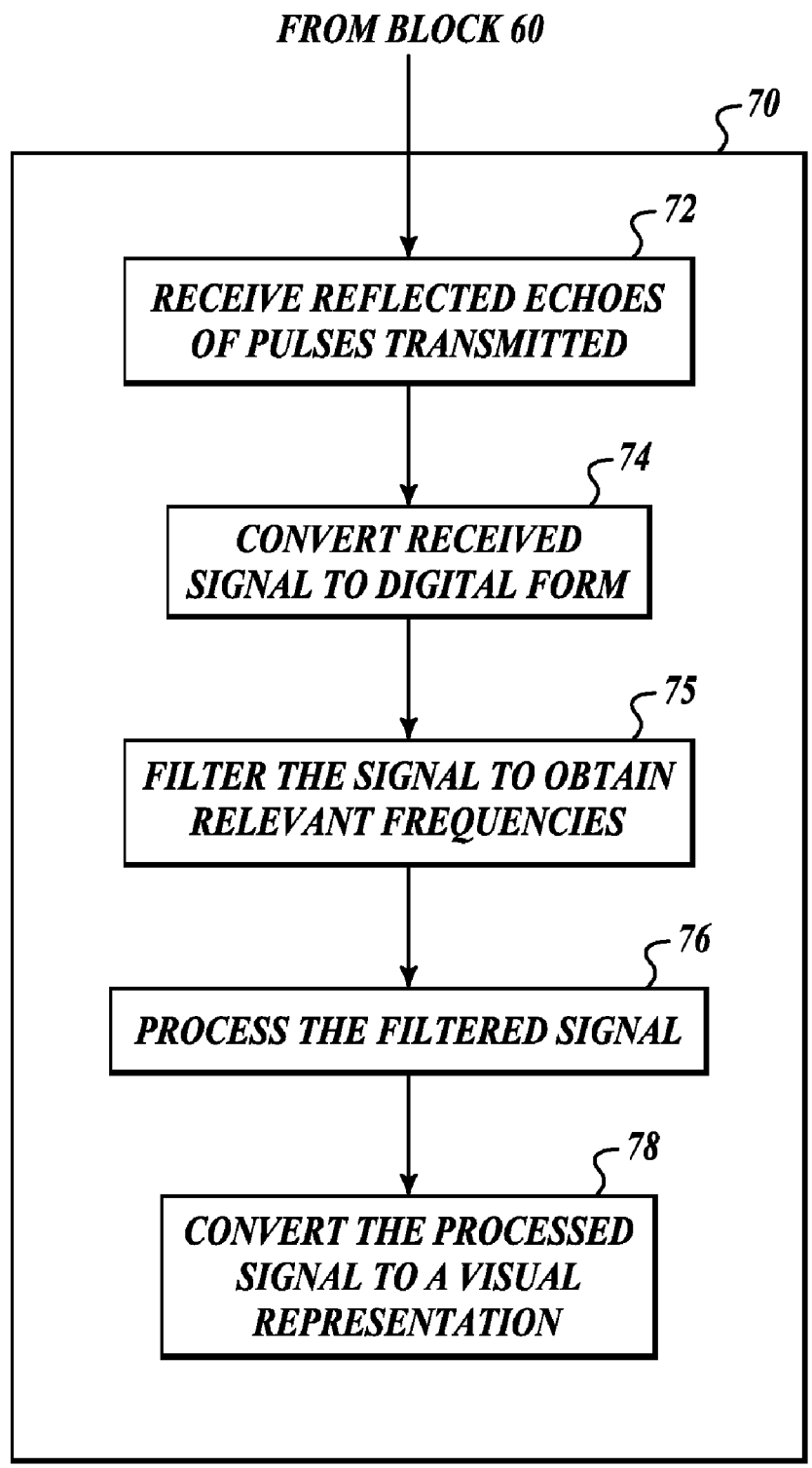

FIG. 5 is a flowchart showing additional detail for the block 70 illustrated in FIG. 3. First, at a block 72, the reflected echoes of the transmitted pulses are received by the receiver 48. The reflected echoes are received using the receiver 48 which is connected to the antenna 54 via the device 50 during reception of the reflected echoes. Next, at a block 74, the received signal is converted to digital form by the A/D converter 26. Then, at a block 75, the signal is filtered to obtain relevant frequencies. This is followed by a block 76 where the filtered signal is processed. Finally, at a block 78, the processed signal is converted to a visual representation. The filter 28 performs the filtering described in the block 75 and the DSP 24 processes the signal and prepares it for conversion to a visual representation. These five more detailed blocks will not necessarily be conducted in the order shown in all embodiments. Some of the blocks may happen in parallel or in orders other than those shown.

Figure 6:
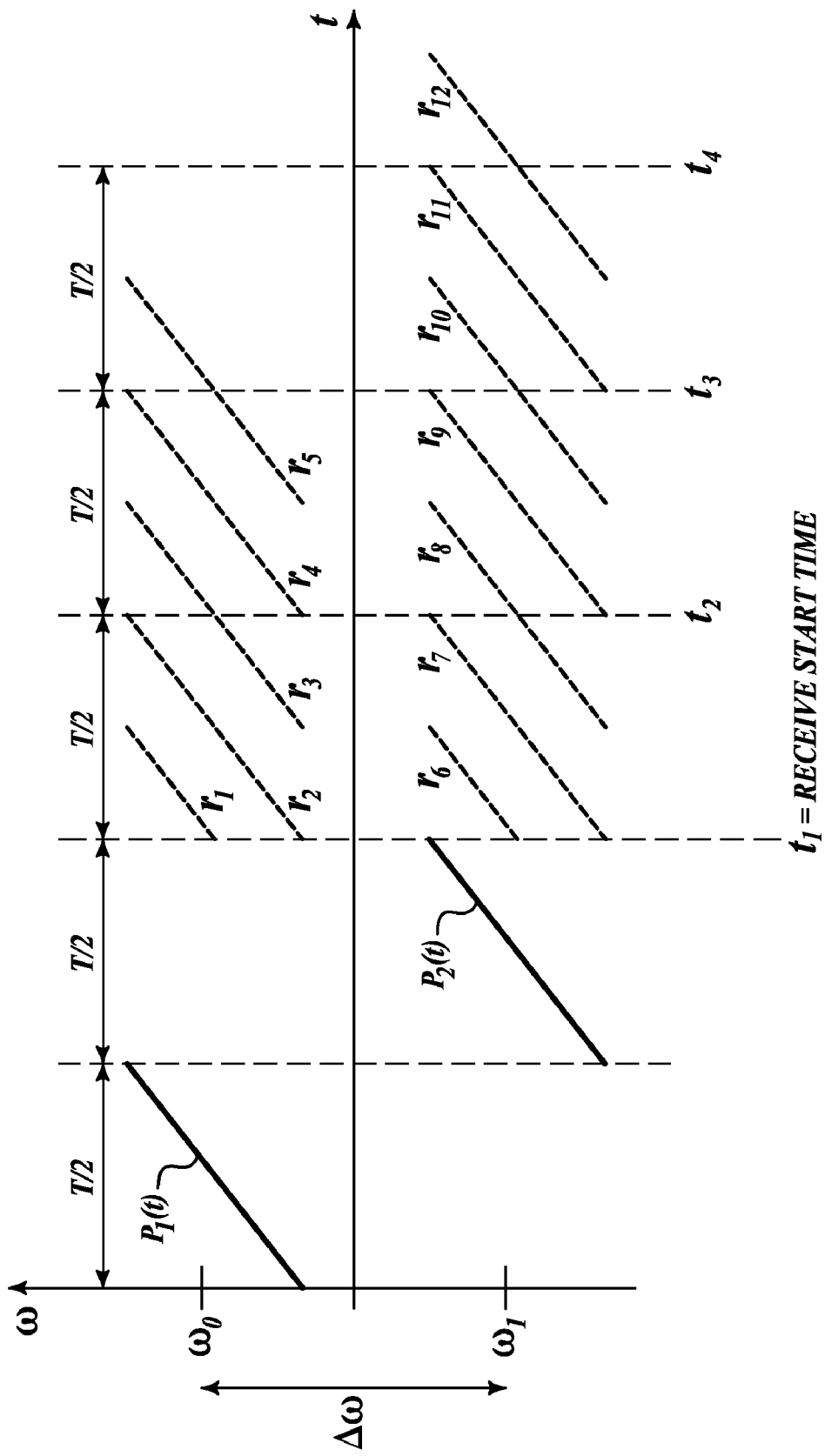
FIG. 6 is an example showing transmitted and received pulses in accordance with an embodiment of the present invention.

FIG. 6 is an example of a time frequency diagram showing both transmitted and reflected pulses in accordance with an embodiment of the present invention. The time frequency diagram illustrates a first transmitted pulse $P_1(t)$ and a second transmitted pulse $P_2(t)$ which are separated by a frequency of $\Delta\omega$. The diagram also shows reflected pulses $r_1, r_2, r_3, r_4$, and $r_5$ for the $P_1(t)$ transmitted pulse and reflected pulses $r_6, r_7, r_8, r_9, r_{10}, r_{11}$, and $r_{12}$ for the $P_2(t)$ transmitted pulse. The reflected pulses indicate point scatter down range from the radar as follows: $r_1$ (3T/4), $r_2$ (T), $r_3$ (5T/4), $r_4$ (3T/2), $r_5$ (7T/4), $r_6$ (T/4), $r_7$ (T/2), $r_8$ (3T/4), $r_9$ (T), $r_{10}$ (5T/4), $r_{11}$ (3T/2), and $r_{12}$ (7T/4). The diagram also illustrates that each transmitted pulse is of duration T/2 and that a receive start time $t_1$ begins after the $P_2(t)$ pulse has finished transmitting at time T.

Although receiving begins at time $t_1$, the reflections of interest received between time $t_1$ and time $t_2$ are affected by partial pulse interference because echoes from partial pulses are not separated by more than T/2 from the echoes of interest in this range. For example, the partial pulse reflection $r_1$ will interfere with the reflection $r_2$. The reflections received between time $t_1$ and $t_2$ are still processed by pulse compression matched filter detectors, such as are shown in FIGS. 7 and 8, so that the reflections received between $t_2$ and $t_3$ will not suffer from partial pulse interference, but the processed data for the portion between $t_1$ and $t_2$ is discarded after the filtration.

Beginning at time $t_2$, reflections from both the $P_1(t)$ data and $P_2(t)$ data are used, but reflections from the $P_1(t)$ data must be delayed by T/2 in order to align them with the reflections from the $P_2(t)$ data. This results in valid data for the closest point scatter ranges of T to 3T/2 coming only from reflections for $P_2(t)$. The processed signals for this range are amplified by a factor of 2 because data from only one of the transmitted radar pulses is being used. This amplification does not negatively affect later processing because the SNR is high at this range. For point scatter farther down range than 3T/2, reflections from both $P_1(t)$ and $P_2(t)$ are used, which allows the energy of a T second pulse to be maintained. For example, processed data from reflections $r_4$ and $r_{11}$ will be summed or combined by the radar processor and processed data from reflections $r_5$ and $r_{12}$ will be summed or combined by the radar processor. This allows imaging starting at T down-range of the radar and avoids partial pulse interference while maintaining the energy of a T second pulse.

Figure 7:
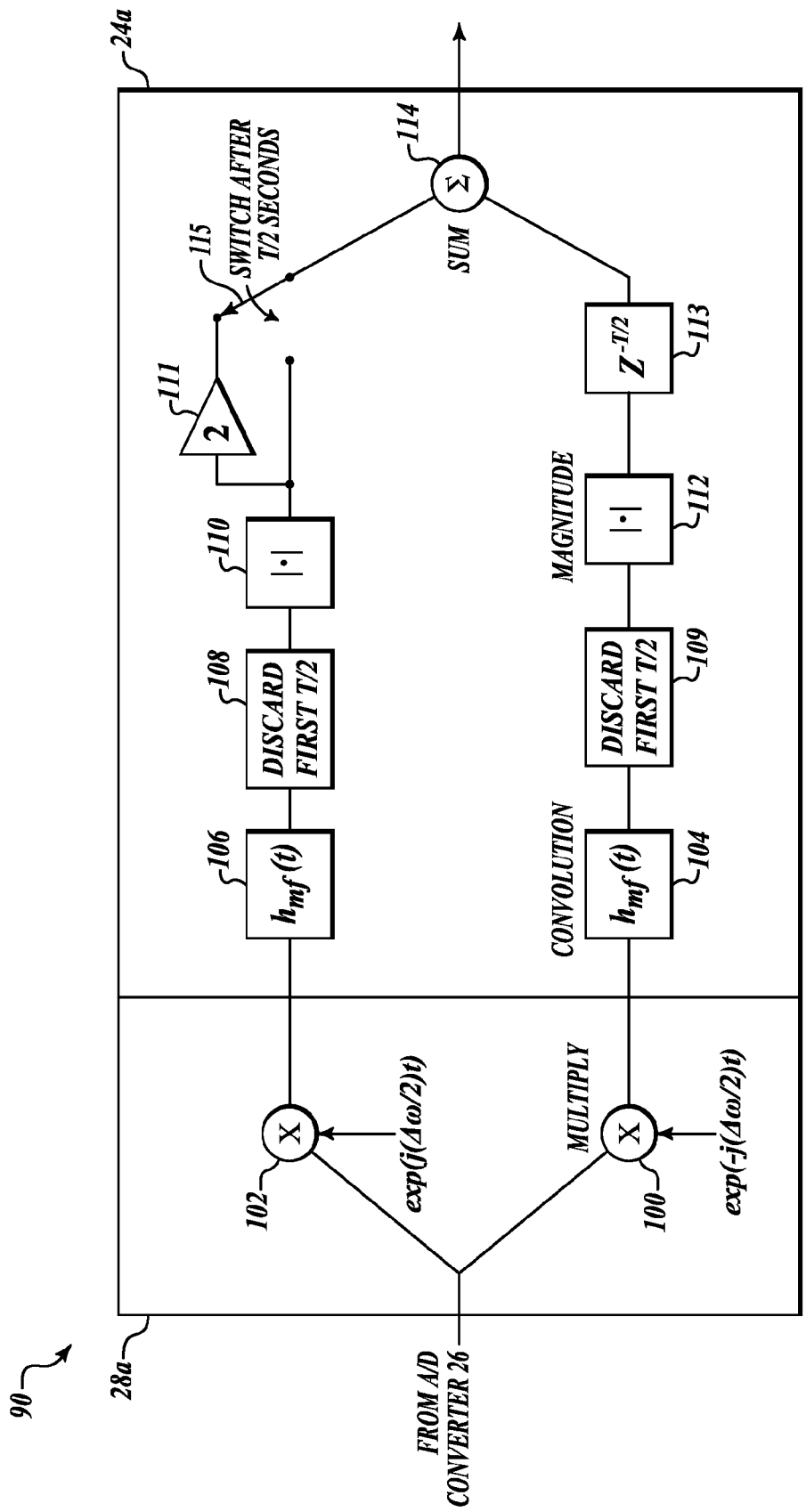
FIGS. 7 and 8 illustrate schematic diagrams of examples of embodiments of the present invention.
Figure 8:
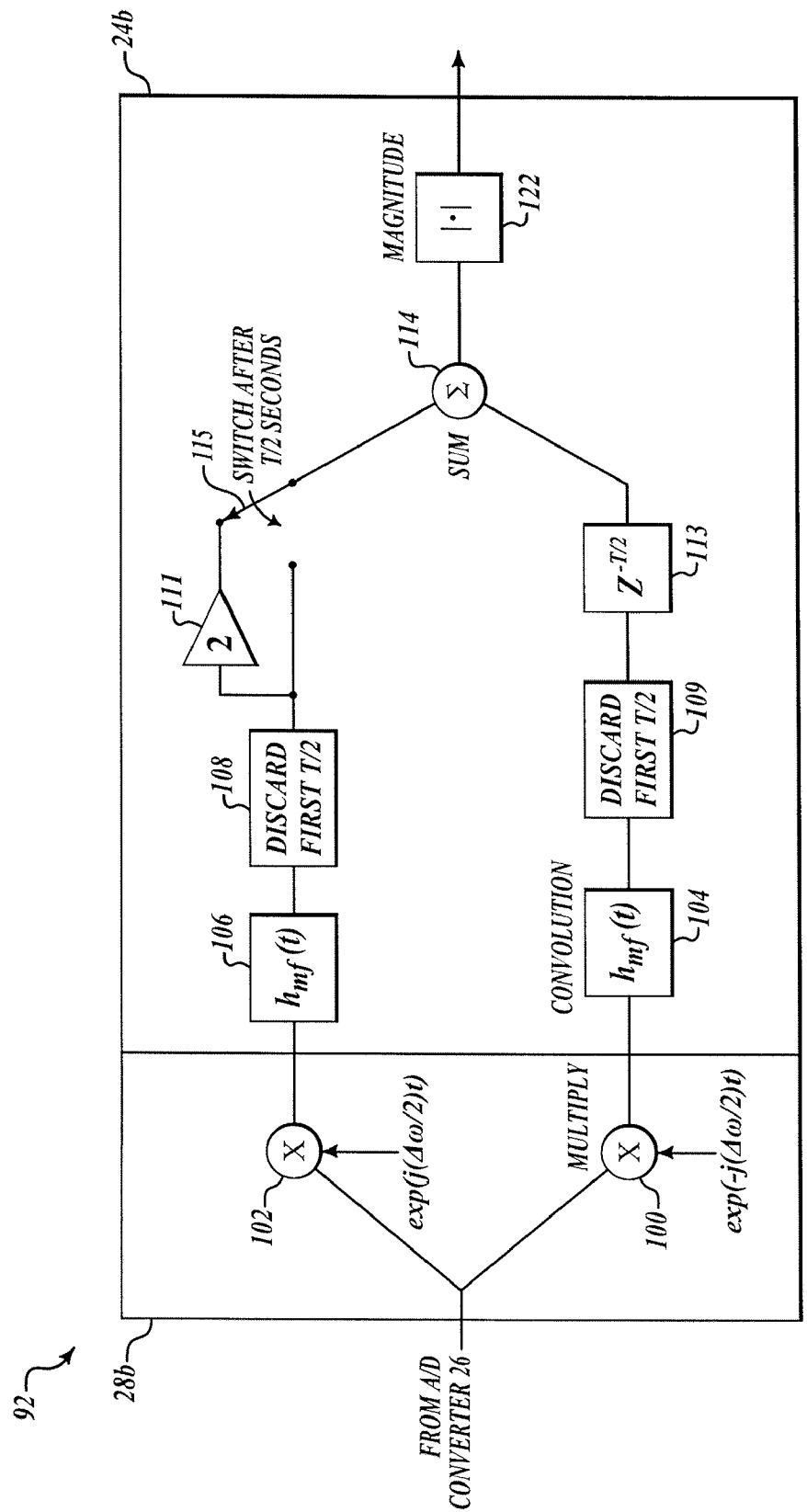

FIG. 7 illustrates an example of signal processing steps 90 for a non-coherent receiver approach. The steps 90 are performed using a filter 28a and a digital signal processor 24a, which are located within the overall system in the same locations as the filter 28 and the DSP 24. A signal, which includes echoes corresponding to both a first and a second transmitted pulse, enters from the A/D converter 26 into the filter 28a. The signal could include 4 MHz complex baseband digital radar data, for example. In other embodiments, the function performed in the filter 28a may be performed by the DSP 24a. Also, an additional filter (not shown) may perform a previous filtering step resulting in the entering signal coming from the additional filter rather than the A/D converter 26.

The filter 28a includes a first multiplier 100 and a second multiplier 102 in parallel. The signal from the A/D converter 26 is received by the multipliers 100 and 102. The multipliers 100, 102 are used to separate the received echoes into a first echo signal corresponding to the first transmitted pulse and a second echo signal corresponding to the second transmitted pulse. The first multiplier 100 is used to filter the received signal so that only the first echo signal corresponding to the first transmitted pulse such as $P_1(t)$ shown in FIG. 6 is processed further in this branch of the signal processing logic. After the first echo signal has been separated, a first pulse compression matched filter detector 104 is used to properly detect the echoes corresponding to the first transmitted pulse and convert them into a first filtered echo signal. Next, the first T/2 duration of the first filtered echo signal is discarded at a truncating element 109 to produce a truncated first filtered echo signal. Then, at a box 112, the magnitude of the first filtered echo signal is taken to produce a non-complex truncated first filtered echo signal. Finally, at a box 113, the non-complex truncated first filtered echo signal is delayed by T/2 to produce a delayed non-complex truncated first filtered echo signal. The delaying which occurs at the box 113 can be performed by appending zeros to the beginning portion of the data, for example. The delayed non-complex truncated first filtered echo signal then passes to a summing element 114.

In like manner, the second multiplier 102 separates out a second echo signal corresponding to the second transmitted pulse such as that shown as $P_2(t)$ in FIG. 6. After the second echo signal has been separated, a second pulse compression matched filter detector 106 is used to properly detect the echoes corresponding to the second transmitted pulse and convert them into a second filtered echo signal. After this step has been performed, the first T/2 duration of the second filtered echo signal is discarded at a truncating element 108 to produce a truncated second filtered echo signal that can later be summed with the processed echoes corresponding to the transmitted pulses from $P_1(t)$ to produce a full power signal. Then, at a block 110, the magnitude is taken of the truncated second filtered echo signal to produce a non-complex truncated second filtered echo signal.

A switch 115 remains in a first switch position for T/2 seconds before changing to a second switch position. When the switch 115 is in the first switch position, the non-complex truncated second filtered echo signal from the block 110 next passes through a block 111 that amplifies the non-complex truncated second filtered echo signal by a factor of two to produce an amplified non-complex truncated second filtered echo signal which then passes to the summing element 114. When the switch 115 is in the second switch position, the non-complex truncated second filtered echo signal passes to the summing element 114 without passing through the block 111. Depending on the position of the switch 115, the delayed non-complex truncated first filtered echo signal is then combined with either the amplified non-complex truncated second filtered echo signal or the non-complex truncated second filtered echo signal to produce an output signal with greater pulse energy than could be obtained by using only one of the T/2 duration pulses for times after T/2. During the first T/2 seconds, the switch 115 will be in the first switch position and the delayed non-complex truncated first filtered echo signal will not contribute to the output signal due to its delay, so the output signal will simply be the amplified non-complex truncated second filtered echo signal. The output signal can then be used in further display processing. The display processing could include scaling the data to fit a display resolution for visual representation of weather date, for example. The scaling may include log compression of the magnitude and interpolation or decimation in time in some embodiments.

The description above and FIG. 7 assume there is no processing delay through the first pulse compression matched filter detector 104 or the second pulse compression matched filter detector 106. This is accomplished, for example, by using a Fast-Fourier Transform (FFT) to implement the convolution performed by the first pulse compression matched filter detector 104 and the second pulse compression matched filter detector 106 and applying a phase term across matched filter coefficients. However, in embodiments where the implementation incurs a processing delay of $\tau$, the amount of signal data discarded by the truncating element 108 and the truncating element 109 is T/2+$\tau$ rather than T/2.

FIG. 8 illustrates an example of signal processing steps 92 for a coherent receiver approach. The steps 92 are implemented using a filter 28b and a digital signal processor 24b, which are located within the overall system in the same locations as the filter 28 and the DSP 24. The figure shows a signal, which includes echoes corresponding to both a first and a second transmitted pulse, entering from the A/D converter 26 into the filter 28b. The signal could include 4 MHz complex baseband digital radar data, for example. In other embodiments, the function performed in the filter 28b may be performed by the DSP 24b. Also, an additional filter (not shown) may perform a previous filtering step resulting in the entering signal coming from the additional filter rather than the A/D converter 26.

The first portion of the signal processing is the same as with the non-coherent receiver approach described for FIG. 7. The differences begin at the point where the truncated first filtered echo signal exits the truncating element 109 and the truncated second filtered echo signal exits the truncating element 108. In the coherent receiver approach, the truncated first filtered echo signal next passes into the box 113 where it is delayed by T/2 to produce a delayed truncated first filtered echo signal. The delaying which occurs at the box 113 can be performed by appending zeros to the beginning portion of the data, for example. The delayed truncated filtered echo signal then passes to the summing element 114.

After the truncated second filtered echo signal exits the truncating element 108, the next processing step is determined by the position of the switch 115. When the switch 115 is in the first switch position, the truncated second filtered echo signal from the block 110 next passes through a block 111 that amplifies the truncated second filtered echo signal by a factor of two to produce an amplified truncated second filtered echo signal which then passes to the summing element 114. When the switch 115 is in the second switch position, the truncated second filtered echo signal passes to the summing element 114 without passing through the block 111. Depending on the position of the switch 115, the delayed truncated first filtered echo signal is then combined with either the amplified truncated second filtered echo signal or the truncated second filtered echo signal to produce a combined signal with greater pulse energy than could be obtained by using only one of the T/2 duration pulses for times after T/2. During the first T/2 seconds, the switch 115 will be in the first switch position and the delayed truncated first filtered echo signal will not contribute to the combined signal due to its delay, so the combined signal will simply be the amplified truncated second filtered echo signal. The combined signal then enters a block 122 where the magnitude is taken of the combined signal to produce a non-complex output signal. The non-complex output signal can then be used in further display processing. The display processing could include scaling the data to fit a display resolution for visual representation of weather date, for example. The scaling may include log compression of the magnitude and interpolation or decimation in time in some embodiments.

While the preferred embodiment of the invention has been illustrated and described, as noted above, many changes can be made without departing from the spirit and scope of the invention. For example, preliminary filtering could be performed using the DSP rather than by using a separate filter. In like manner, other processing steps implemented in separate devices could also be combined into single components and processing steps performed in single components could be divided among multiple components. Additionally, the receiver and transmitter could be integrated into a single transceiver device rather than being separate components. Accordingly, the scope of the invention is not limited by the disclosure of the preferred embodiment. Instead, the invention should be determined entirely by reference to the claims that follow.

What is claimed is:

1. A radar transmitting and processing method comprising:
   generating two consecutive radar pulses, each pulse having a time length duration of T/2;
   transmitting the generated radar pulses;
   receiving reflected echoes of the transmitted radar pulses; and
   processing the received echoes into a usable form,
   wherein processing the received echoes comprises:
      separating the received echoes into a first echo signal corresponding to the first transmitted pulse and a second echo signal corresponding to the second transmitted pulse;
      filtering the first echo signal with a first pulse compression matched filter detector to produce a first filtered echo signal;
      filtering the second echo signal with a second pulse compression matched filter detector to produce a second filtered echo signal; and
      discarding the first T/2 duration of the first filtered echo signal to produce a truncated first filtered echo signal.

2. The method of claim 1, wherein generating two consecutive pulses comprises:
   generating two consecutive pulses wherein each pulse has linear frequency modulation, a center frequency, and the same bandwidth such that the separation between the center frequencies of the pulses is greater than the bandwidth.

3. The method of claim 1, wherein processing further comprises producing a visual representation of weather data.

4. The method of claim 1, wherein processing the received echoes further comprises:
   discarding the first T/2 duration of the second filtered echo signal to produce a truncated second filtered echo signal:

taking the magnitude of the truncated first filtered echo signal to produce a non-complex truncated first filtered echo signal;

taking the magnitude of the truncated second filtered echo signal to produce a non-complex truncated second filtered echo signal; and delaying the non-complex truncated first filtered echo signal by T/2 to produce a delayed non-complex truncated first filtered echo signal.

5. The method of claim 1, wherein processing the received echoes further comprises:

delaying the truncated first filtered echo signal by T/2 to produce a delayed truncated first filtered echo signal.

6. A system comprising:

a radar processor comprising:
  a first component configured to generate control signals for two consecutive pulses; and
  a second component configured to process received echoes into a usable form;

a waveform and pulse train generator and synthesizer device for generating consecutive pulses based on the control signals, each of the consecutive pulses having a time length duration of T/2;

a transmitter for transmitting the generated consecutive pulses; and a receiver for receiving reflected echoes of the transmitted pulses, wherein the second component comprises:
  a first multiplier for separating the echoes corresponding to the first transmitted pulse from the received echoes;
  a second multiplier for separating the echoes corresponding to the second transmitted pulse from the received echoes;
  a first pulse compression matched filter detector for filtering the echoes corresponding to the first transmitted pulse to produce a first filtered echo signal;
  a second pulse compression matched filter detector for filtering the echoes corresponding to the second transmitted pulse to produce a second filtered echo signal;
  a first truncating element for discarding the first T/2 duration of the first filtered echo signal to produce a truncated first filtered echo signal; and
  a second truncating element for discarding the first T/2 duration of the second filtered echo signal to produce a truncated second filtered echo signal.

7. The system of claim 6, wherein the first component is configured to generate control signals for two consecutive pulses, each pulse having linear frequency modulation, a center frequency, and the same bandwidth such that the separation between the center frequencies of the pulses is greater than the bandwidth.

8. The system of claim 6, wherein the second component is configured to process the received echoes into a visual representation of weather data.

9. The system of claim 6, wherein the second component further comprises:

a first magnitude element for converting the truncated first filtered echo signal to a non-complex truncated first filtered echo signal;

a second magnitude element for converting the truncated second filtered echo signal to a non-complex truncated second filtered echo signal; and a delaying element for delaying the non-complex truncated first filtered echo signal by T/2.

10. The system of claim 6, wherein the second component further comprises:

a delaying element for delaying the truncated first filtered echo signal by T/2.

11. The method of claim 4, wherein processing the received echoes further comprises:

amplifying the non-complex truncated second filtered echo signal by a factor of two during the first T/2 seconds to produce an amplified non-complex truncated second filtered echo signal.

12. The method of claim 11, wherein processing the received echoes further comprises:

summing the delayed non-complex truncated first filtered echo signal and the amplified non-complex truncated second filtered echo signal to produce an output signal during the first T/2 seconds; and summing the delayed non-complex truncated first filtered echo signal and the non-complex truncated second filtered echo signal to produce an output signal after the first T/2 seconds.

13. The method of claim 5, wherein processing the received echoes further comprises:

amplifying the truncated second filtered echo signal by a factor of two during the first T/2 seconds to produce an amplified truncated second filtered echo signal.

14. The method of claim 13, wherein processing the received echoes further comprises:

summing the delayed truncated first filtered echo signal and the amplified truncated second filtered echo signal to produce a combined signal during the first T/2 seconds;

summing the delayed truncated first filtered echo signal and the truncated second filtered echo signal to produce a combined signal after the first T/2 seconds; and taking the magnitude of the combined signal to produce a non-complex output signal.

15. The system of claim 9, wherein the second component further comprises:

a switch that resides at a first switch position for the first T/2 seconds and at a second switch position thereafter; and an amplifier that amplifies the non-complex truncated second filtered echo signal by a factor of 2 when the switch is in the first switch position to produce an amplified non-complex truncated second filtered echo signal.

16. The system of claim 15, wherein the second component further comprises a summing element for summing the delayed non-complex truncated first filtered echo signal with the amplified non-complex truncated second filtered echo signal when the switch is in the first position, and with the non-complex truncated second filtered echo signal when the switch is in the second position to produce an output signal.

17. The system of claim 10, wherein the second component further comprises:

a switch that resides at a first switch position for the first T/2 seconds and at a second switch position thereafter; and an amplifier that amplifies the truncated second filtered echo signal by a factor of 2 when the switch is in the first switch position to produce an amplified truncated second filtered echo signal.

18. The system of claim 17, wherein the second component further comprises:

a summing element for summing the delayed truncated first filtered echo signal with the amplified truncated second filtered echo signal when the switch is in the first position, and with the truncated second filtered echo signal when the switch is in the second position to produce a combined signal; and a magnitude element for converting the combined signal to a non-complex output signal.

19. An improved airborne weather radar system for reducing partial pulse interference, the system comprising:

a radar processor comprising:

a first component configured to generate control signals for two time linked consecutive pulses; and a second component configured to process received echoes into a usable form;

a waveform and pulse train generator and synthesizer device for generating consecutive pulses based on the control signals;

a transmitter for transmitting the generated consecutive pulses; and a receiver for receiving reflected echoes of the transmitted pulses, wherein the second component is also configured to reduce partial pulse interference by summing processed echoes from each of the two consecutive pulses.

* * * * *